United States Patent [19]

Baddiley

[11] Patent Number: 4,852,065
[45] Date of Patent: Jul. 25, 1989

[54] DATA REORGANIZATION APPARATUS

[76] Inventor: Eric Baddiley, 8 Maskery Place, Congleton, Cheshire CW12 1NF, England

[21] Appl. No.: 736,866

[22] Filed: May 22, 1985

[30] Foreign Application Priority Data

Jun. 2, 1984 [GB] United Kingdom ................ 8414109

[51] Int. Cl.$^4$ ............................................. G11C 13/00
[52] U.S. Cl. .................................................. 365/221
[58] Field of Search ... 364/200 MS File, 900 MS File; 365/221, 222

[56] References Cited

U.S. PATENT DOCUMENTS

| | | | |
|---|---|---|---|
| 3,995,253 | 11/1976 | Morrin, II et al. | 340/146.3 |
| 4,207,687 | 6/1980 | Haas et al. | 35/12 R |
| 4,393,444 | 7/1983 | Weinberg | 364/200 |
| 4,484,265 | 11/1984 | Czekalski | 364/200 |
| 4,596,001 | 6/1986 | Baba | 365/221 |
| 4,642,797 | 2/1987 | Hoberman | 365/221 |
| 4,646,270 | 2/1987 | Voss | 365/221 |
| 4,733,376 | 3/1988 | Ogawa | 365/221 |

OTHER PUBLICATIONS

K. E. Batcher, "The Multidimensional Access Memory in STARAN", IEEE Transactions on Computers, Feb. 1977, pp. 174–177.

Primary Examiner—Gareth D. Shaw
Assistant Examiner—John G. Mills
Attorney, Agent, or Firm—Lee & Smith

[57] ABSTRACT

Data reorganization apparatus includes a double buffer arrangement in which data is written into each buffer by rows and is read out by columns. The inputs and outputs of the buffers are time-division multiplexed, which reduces the required width of each buffer by the product of the input and output multiplexing factors. The apparatus can be used for corner turning of image data e.g. receiving data in sub-frame order and reorganizing it into scan-line order for display.

12 Claims, 5 Drawing Sheets

DATA REORGANIZATION APPARATUS

This invention relates to data reorganization apparatus.

The invention is particularly although not exclusively concerned with reorganization of image data. When processing image data, it is often convenient to divide each image frame into a number of sub-frames of a size more convenient for processing. However, in order to display the data, it is necessary to output the data as a sequence of scan lines. This involves reorganizing the data, since each sub-frame contains portions of a number of different scan lines and, conversely, each line is divided among a number of different sub-frames.

This data reorganization operation, for converting between the sub-frame order and the scan-line order, is sometimes referred to as corner turning since, as will be shown, it is equivalent to writing the data into a three-dimensional address space as a first set of parallel planes and then reading it from the address space as a second set of parallel planes at right angles to the first set.

This corner-turning may be performed using a buffer store having a width equal to the product of the sizes of the input and output data words. (By the width of a store is meant the number of bit positions which can be accessed in parallel for reading or writing). For example, if the input and output data are both in the form of 32-bit words, then the corner-turning buffer would have a width equal to $32 \times 32 = 1024$ (1K) bit positions. These 1K-bit positions are logically organized as a $32 \times 32$ array. Input data words are written into the rows of the array, and output data words are read out of the columns, to achieve the desired corner-turning.

However, this method of corner-turning requires a very wide buffer store, which in turn requires a large number of memory components. For example, if 4-bit-wide RAM components are used, a total of 256 such components are required to provide a 1K-bit wide store.

The object of the present invention is to alleviate this problem so as to reduce the required number of memory components.

SUMMARY OF THE INVENTION

According to the invention there is provided data reorganization apparatus comprising:
(a) a buffer store having a width equal to $p \times q$ bit positions, these positions being logically arranged in rows and columns with p bits per row and q bits per column,
(b) multiplexing means for receiving a succession of input data words each of $n \times p$ bits and converting these into a succession of p-bit groups at n times the clock rate of the input words,
(c) input means for writing each p-bit group into a selected row of bit positions in the buffer store,
(d) output means for reading a succession of q-bit groups from selected columns of bit positions in the buffer store, and
(e) demultiplexing means for assembling the q-bit groups read from the buffer store into $m \times q$-bit words at one mth the clock rate of the q-bit groups, where p,q,n and m are all integers greater than one.

It can be seen that the apparatus in accordance with the invention handles input and output words of $n \times p$ and $m \times q$ bits respectively, using a buffer store which is only $p \times q$ bits wide. In comparison, the basic corner-turning arrangement described above would require a buffer store of width $n \times p \times m \times q$. In other words, the invention reduces the required width of the buffer by a factor of $n \times m$, with a corresponding saving in the number of components.

This saving is achieved by increasing the clock rate at which the buffer operates relative to the input and output clock rates: the buffer must operate n times faster than the input data when writing to the buffer, and m times faster than the output data when reading. However, this is in general a favourable trade-off since the speed of the buffer increases only linearly with n (or m) whereas the width of the buffer decreases as the product $n \times m$.

For example, in a particular embodiment of the invention to be described below, the apparatus handles input and output data words of 32 bits, using a buffer store 64 bits wide; that is, $p = q = 8$ and $n = m = 4$. In this case, the width of the buffer store is reduced by a factor of 16 compared with the basic arrangement described above, whereas the speed of the buffer is increased by a factor of four.

One data reorganization apparatus in accordance with the invention will now be described by way of example with reference to the accompanying drawings.

DESCRIPTION OF AN EMBODIMENT OF THE INVENTION

Figure 1:
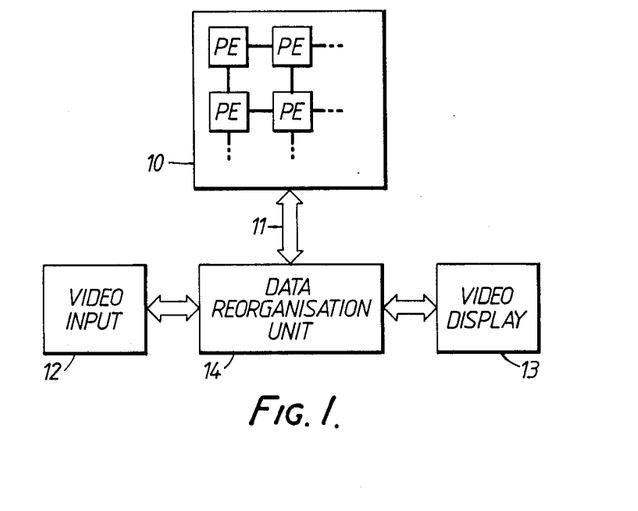
FIG. 1 is a block diagram of apparatus for processing image data, including a data reorganization unit in accordance with the invention.

FIG. 1 shows apparatus for processing image data. The apparatus includes an array processor 10, consisting of 1024 processing elements (PE) connected together in rows and columns to form a $32 \times 32$ array. All the processing elements are operable in parallel, under control of a single stream of control signals from a common control unit (not shown). Each processing element contains a single-bit arithmetic and logic unit, and has a $16K \times 1$ bit memory. The memories in the array processor form a three-dimensional store, having 16K individually addressable planes, each plane consisting of an array of $32 \times 32$ bits, one in each PE. Any selected plane can be read out, over a 32-bit highway 11.

Details of the array processor 10 form no part of the present invention and so will not be described further. The array processor 10 may, for example, be similar to that described in U.S. Pat. No. 3,979,728.

Input data for the array processor 10 can be supplied by a video input device 12, such as a camera, and output data from the array processor can be fed to a video display device 13.

The video input and output devices handle the image data in the form of a series of video frames. Each frame consists of 1024 horizontal scan lines, each line containing 1024 picture elements (pixels). Each pixel may be encoded as a single bit (for black-and-white images) or as a plurality of bits (for grey-scale or colour images). For simplicity, only the black-and-white case will be considered here; it will be appreciated by those skilled in the art that the invention is equally applicable to the processing of grey-scale or colour images.

For the purpose of processing, each frame is divided into a plurality of sub-frames, each of which consists of an array of 32×32 pixels. Each of those sub-frames can therefore be mapped directly on to the 32×32 array of processing elements PE, with one pixel per processing element. Successive sub-frames are stored in successive memory planes in the array processor, allowing it to operate on any part of the image as required.

Input data from the video input device 12 to the array processor 10, and output data from the processor to the video display device 13, pass through a data reorganization unit 14. This reorganizes the data as will be described so as to convert it between the scan-line format required by the video devices, and the sub-frame format required by the array processor.

DATA REORGANIZATION UNIT

Figure 2:
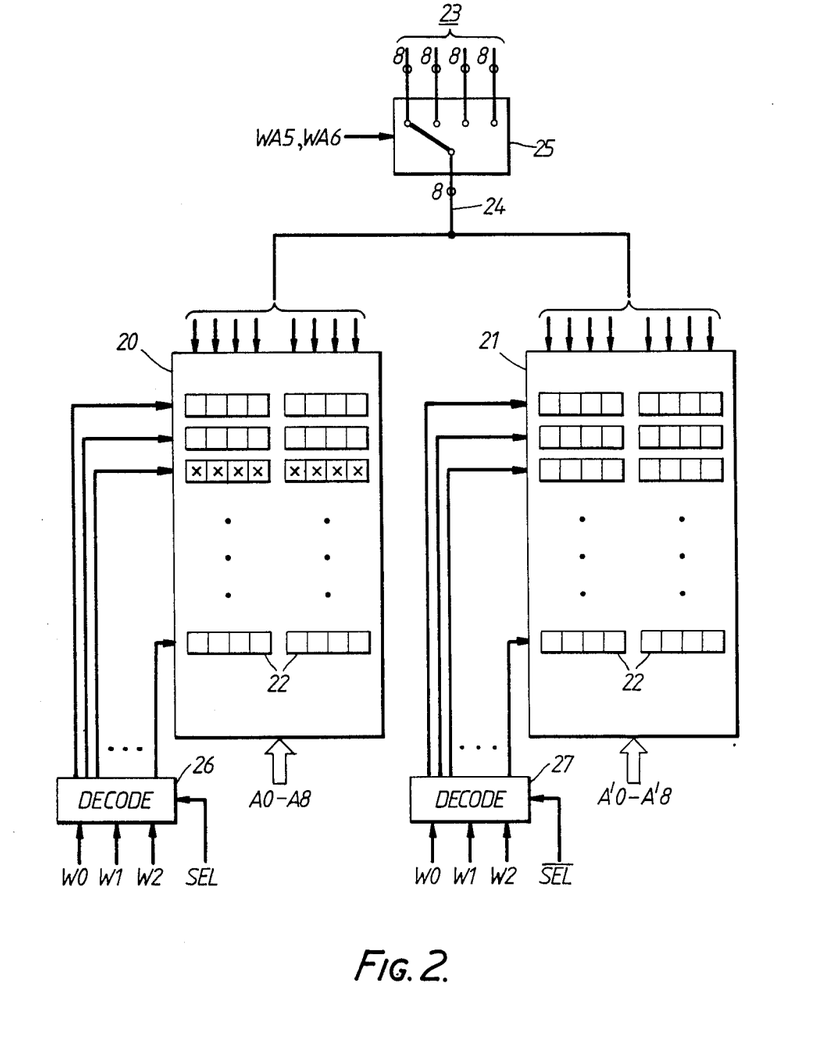
FIGS. 2, 3 and 4 show the data reorganization unit in detail.

Referring to FIG. 2, this shows the data reorganization unit 14 in detail.

The unit comprises two buffer stores 20,21 which are used alternately for reading and writing, so as to provide a double buffer arrangement. The buffers are controlled by a selection signal SEL so that when SEL=1, buffer 20 is selected for writing and buffer 21 for reading, and when SEL=0, buffer 20 is used for reading and buffer 21 for writing.

Each buffer 20,21 consists of sixteen random-access memory (RAM) components 22. Each RAM 22 contains 512 individually addressable locations and has four bit positions, i.e. each location contains four bits which can be written or read in parallel. In other words, each RAM is four bits wide, and therefore each buffer 20,21 has an overall width of 16×4=64 bit positions. These 64 bit positions are logically organized as shown as square array having eight rows and eight columns. All the RAMs in the buffer 20 are addressed in parallel by a nine-bit address A0-A8 which selects one of the 512 locations in each RAM. Similarly, the buffer 21 is addressed by a nine-bit address A'0-A'8.

The data reorganization unit 14 receives input data words on a 32-bit wide path 23, from either the array processor 10 or the video input device 12. These words are multiplexed down to an 8-bit wide path 24, by means of a multiplexing switch 25. The path 24 therefore carries a stream of eight-bit bytes at a clock rate four times that of the input data words. This path is connected in parallel to both buffers 20,21.

Buffer 20 has a decoder 26 which is enabled when SEL=1, i.e. when this buffer is selected for writing. Similarly, buffer 21 has a decoder 27 which is enabled when SEL=0. The currently enabled decoder 26 or 27 decodes three control bits W0, W1, W2 to produce a write enable signal which selects one row of bit positions in the associated buffer (e.g. the row indicated by X—X in FIG. 2). This causes the input data byte on path 24 to be written into the selected row.

Figure 3:
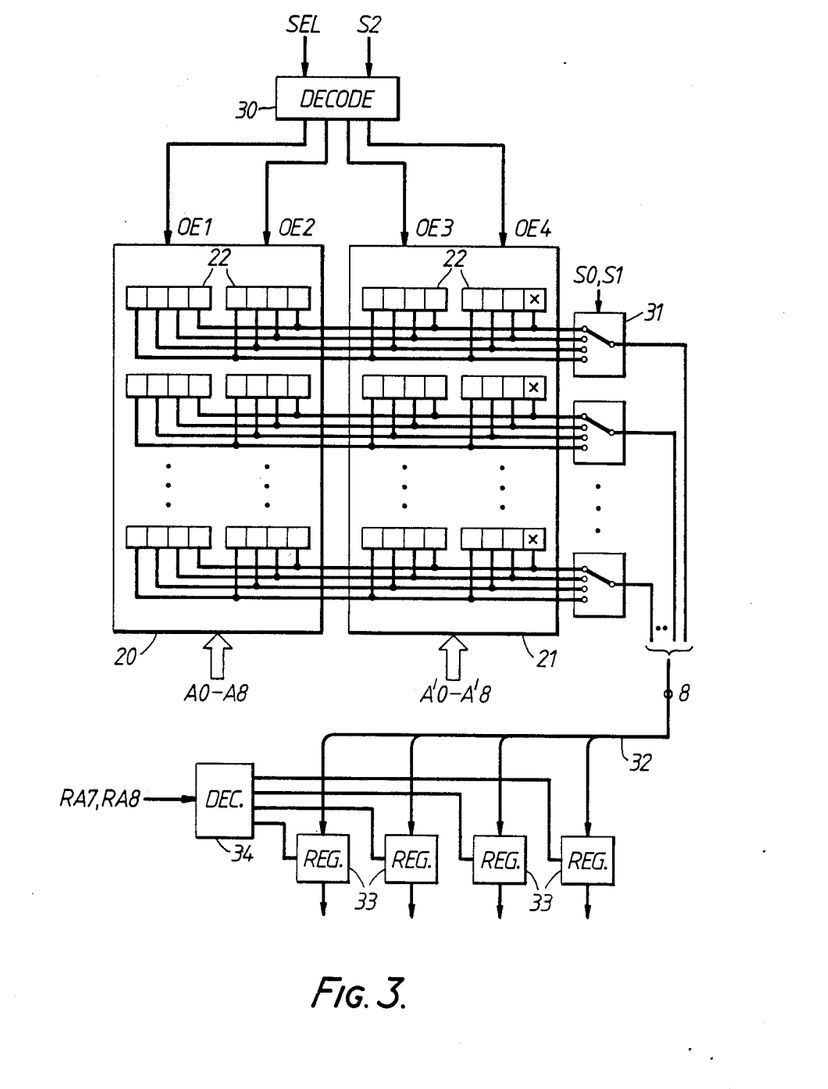

Referring now to FIG. 3, reading from the buffers 20,21 is controlled by three bits S0,S1,S2. Bit S2 is decoded along with the selection signal SEL in a decoder 30 to produce one of four output enable signals OE1-OE4 as follows:

| SEL | S2 | Output |
|-----|----|--------|
| 0   | 0  | OE1    |
| 0   | 1  | OE2    |
| 1   | 0  | OE3    |
| 1   | 1  | OE4    |

The signals OE1 and OE2 are connected to the output enable terminals of the two columns of RAMs in buffer 20, and the signals OE3 and OE4 are connected to the output enable terminals of the two columns of RAMs in buffer 21. The data outputs of the RAMs are connected to eight 4:1 switches 31, controlled by the bits S0,S1. These switches select one bit position from each RAM.

Thus, it can be seen that SEL selects one of the buffers 20,21 for reading, S2 selects one column of RAMs within that buffer, and S0, S1 select one column of bit positions (such as that represented by X—X in FIG. 3) from the selected column of RAMs. The bits are read out on an 8-bit output path 32.

The path 32 is connected in parallel to the data inputs of four 8-bit registers 33. These registers are clocked in turn by signals from a decoder 34, so as to assemble each group of four successive bytes into a 32-bit word. In other words, the registers 33 demultiplex the data, converting it from a succession of 8-bit bytes into 32-bit words at one quarter of the clock rate of the bytes. The output of the registers 33 is fed either to the video display 13 or to the array processor 10.

Figure 4:
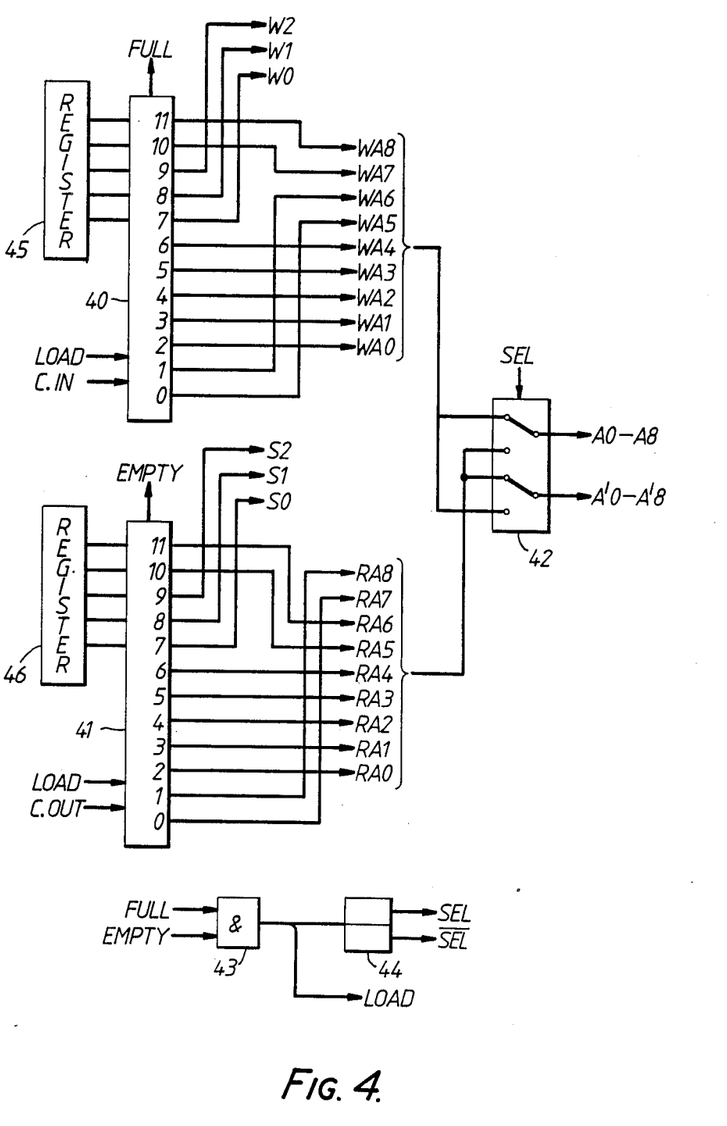

Referring now to FIG. 4, the buffers 20,21 are controlled by two 12-bit counters 40,41. The bits of each counter are numbered 0-11 where bit 0 is the least significant bit.

Bits 2,3,4,5,6,0,1,10,11 of counter 40 supply a write address WA0-WA8, while bits 7,8,9 supply the control signals W0,W1,W2. Similarly, bits 2,3,4,5,6,10,11,0,1 of counter 41 supply a read address RA0-RA8, while bits 7,8,9 supply the control signals S0,S1,S2.

The read and write addresses are connected to the inputs of a switching circuit 42, which is controlled by the signal SEL. When SEL=1, the switching circuit takes the position as shown, so that the address A0-A8 for buffer 20 is supplied by the write address WA0-WA8 while the address A'0-A'8 for buffer 21 is supplied by the read address RA0-RA8. When SEL=0 the circuit 42 is switched over so that these connections are reversed.

Bits WA5,WA6 also provide the control for the multiplexing switch 25 (FIG. 2) and bits RA7,RA8 provide the control for the demultiplexing registers 33 by way of decoder 34 (FIG. 3).

The counter 40 is incremented by a clock signal C.IN which has a frequency equal to four times the input data word rate. Similarly, the counter 41 is incremented by a clock signal C.OUT at a frequency four times the desired output data word rate.

When the counter 40 reaches its maximum count value (all ones) it stops and produces a signal FULL which indicates that the buffer which is currently being used for writing is now full. Similarly, when the counter 41 reaches its maximum count value, it stops and produces a signal EMPTY which indicates that the buffer which is currently being used for reading is now empty. When both these signals are true, an AND gate 43 is enabled, and this switches a bistable circuit 44 into its opposite state so as to complement the value of SEL. This reverses the roles of the two buffers so that the buffer which has just been written to is now selected for reading and vice versa.

The AND gate 43 also produces a LOAD signal which causes preset values from two five-bit registers 45,46 to be loaded into bits 7–11 of the respective counters 40,41, the remaining bits 0–6 being reset to zero. These preset values allow the reorganisation unit to handle words of different sizes if required. For handling 32-bit input and output words, both the preset values are zero; for smaller word sizes, they are set to non-zero values.

OPERATION

Figure 5:
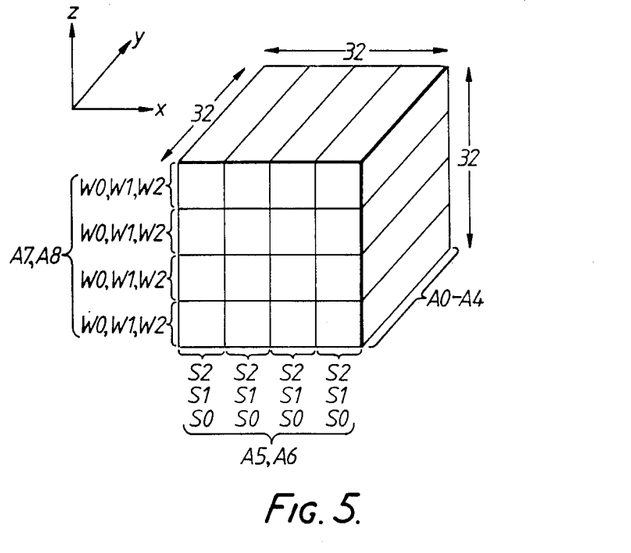
FIG. 5 is a schematic diagram showing the logical address space of the data reorganization unit.

It can be seen that each buffer 20,21 contains a total of 32K bits (i.e. 16 RAMs each with 512×4 bits). The bits are regarded as being logically arranged in a 32×32×32 cube as shown in FIG. 5. (This Figure relates to the buffer 20; buffer 21 is similar except that it has address bits A'0–A'8 instead of A0–A8).

As shown, the x-dimension of this address space is addressed by bits S0,S1,S2,A5,A6, where bits A5,A6 specify one of four vertical layers, and bits S0,S1,S2 specify one vertical plane of bits within this layer. The y-dimension is addressed by bits A0–A4. The z-dimension is addressed by bits W0,W1,W2,A7,A8, where bits A7,A8 specify one of four horizontal layers, and bits W0,W1,W2 specify one horizontal bit plane within this layer.

When writing data into buffer 20, each byte is written horizontally in this address space, parallel to the x-axis, into a location specified by A0–A8 and W0–W2. As can be seen from FIG. 4, when writing to the buffer 20, bits A5,A6 come from the least significant end of counter 40, bits A0–A4 from the middle, and bits W0,W1,W2,A7,A8 from the most significant end. Thus, the bits A5,A6 are incremented for each byte, so that successive bytes are written into successive byte locations along the direction of the x-axis. A complete 32-bit word is therefore written along a row parallel to the x-axis. The bits A0–A4 are incremented for each word, so that successive words are written into successive rows in the direction of the y-axis. A complete 32×32 plane of data is therefore built up parallel to the x-y plane. Successive data planes are written in the direction of the z-axis, as the bits W0,W1,W2,A7,A8 are incremented.

When reading from the buffer 20, each byte is written vertically, parallel to the z-axis, into a location specified by the bits A0–A8 and S0–S2. As seen from FIG. 4, when reading from the buffer, the bits A7,A8 are derived from the least significant end of the counter 41, bits A0–A4 from the middle, and bits S0,S1,S2,A5,A6 from the most significant end. Thus, the bits A7,A8 are incremented for each byte, so that successive bytes are read from successive byte locations along the direction of the z-axis. A complete 32-bit word is therefore read from a column parallel to the z-axis. The bits A0–A4 are incremented for each word so that successive words are read out from successive columns in the direction of the y-axis. In this way, a complete plane of data parallel to the y-z plane is read out. Successive data planes in the direction of the x-axis are read out as the bits S0,S1,S2,A5 and A6 are incremented.

In summary, data is written into the buffer as a sequence of planes parallel to the x-y plane, and is then read out as a sequence of planes parallel to the y-z plane (i.e. at right angles to the first planes). This enables the buffer to act as a corner-turning buffer for reorganizing data.

In the system shown in FIG. 1, data from the array processor 10 is received by the buffer in sub-frame order, and successive sub-frames are therefore written into the buffer in successive x-y planes. When the buffer is full, it contains a complete row of sub-frames, consisting of 32 complete scan lines. The data is then read out of successive y-z planes. Each of these planes contains the 1024 bits making up a single scan line. Thus the output data is in the correct order for feeding to the video display 13. The operation of the buffer is similar for data passing between the video input device 12 and the array processor 10.

VARIABLE SEQUENCE GENERATOR

Figure 6:
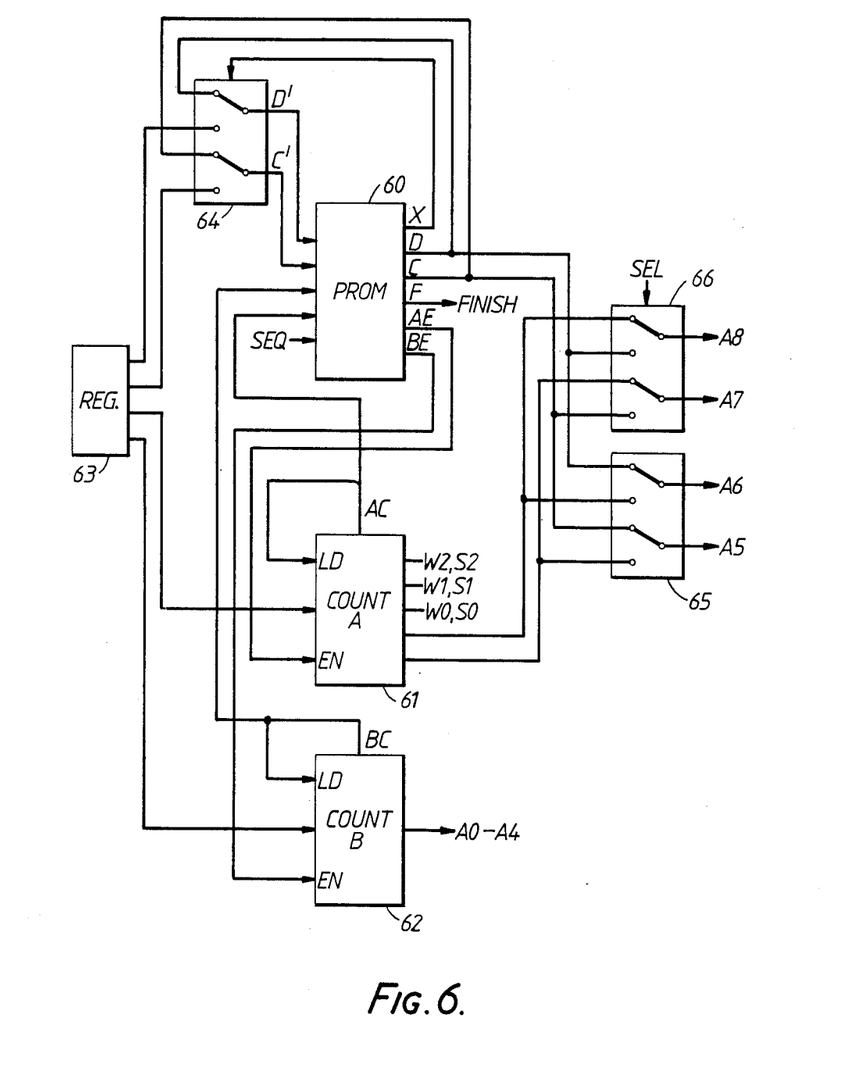
FIG. 6 illustrates a modification of part of the reorganization unit.

The arrangement described above may be modified by replacing the counters 40,41 and the switch 432 by a pair of variable address sequence generators, one for each buffer. FIG. 6 shows the generator for buffer 20; that for buffer 21 is identical except that it is controlled by the inverse of SEL, and produces the address bits A'0–A'8 instead of A0–A8.

The variable sequence generator comprises a programmable read-only memory (PROM) 60 and two counters 61,62 which produce two five-bit counts A and B. The PROM has 512 individually addressable locations, each of which holds six bits, providing six output signals X,D,C,AE,BE and F. Bits C and D provide two single-bit counts which can be combined to act as a two-bit count. Bit X acts as the carry-out for the two-bit count. Bits AE and BE are connected to the enable inputs EN of the counters 61,62 so that whenever one of those bits is true the corresponding count A or B is incremented at the next clock beat. Bit F provides an output signal FINISH indicating the end of the address sequence.

The sequence generator receives a 12-bit preset start address from a register 63. This controls the length of the generated address sequence, in the same way as registers 45,46 in FIG. 4. The generator also receives a 5-bit sequence number SEQ which selects a particular sequence.

The PROM 60 is addressed by a nine-bit address. The first two bits C',D' of this address are supplied by a two-way switch 64 controlled by bit X. When X=0, the switch is in the position shown and hence selects bits C,D. When X=1, the switch is set into the opposite position and therefore selects two preset bits from the register 63. The next two address bits are supplied by carry out signals AC,BC from the counters 62,62. The remaining five address bits are supplied by the sequence number SEQ.

The carry-out signals AC,BC are also fed to the load terminals LD of the respective counters 61,62 so that, whenever one of these counters overflows, it is reloaded with preset bits from the register 63.

It can be seen that the sequence generator provides two five-bit counts A,B and two single bit counts C and D. By suitably programming the PROM 60, these four counts can be assembled in various different ways to form a single 12-bit count. For example, it may be desired to assemble the counts in the order A,D,C,B where A provides the least significant 5 bits of the 12-bit count and B provides the most significant five bits.

This count sequence can be achieved by programming the first 16 locations of the PROM 60 as shown in Table I below.

TABLE I

| \multicolumn{4}{c}{Inputs} | | | | \multicolumn{6}{c}{Outputs} | | | | | |
|----|----|----|----|----|----|---|---|---|---|
| AC | BC | C' | D' | AE | BE | C | D | X | F |
| 0 | 0 | 0 | 0 | 1 | 0 | 0 | 0 | 0 | 0 |
| 0 | 0 | 0 | 1 | 1 | 0 | 0 | 1 | 0 | 0 |
| 0 | 0 | 1 | 0 | 1 | 0 | 1 | 0 | 0 | 0 |
| 0 | 0 | 1 | 1 | 1 | 0 | 1 | 1 | 0 | 0 |
| 0 | 1 | 0 | 0 | 1 | 0 | 0 | 0 | 0 | 0 |
| 0 | 1 | 0 | 1 | 1 | 0 | 0 | 1 | 0 | 0 |
| 0 | 1 | 1 | 0 | 1 | 0 | 1 | 0 | 0 | 0 |
| 0 | 1 | 1 | 1 | 1 | 0 | 1 | 1 | 0 | 0 |
| 1 | 0 | 0 | 0 | 1 | 0 | 0 | 1 | 0 | 0 |
| 1 | 0 | 0 | 1 | 1 | 0 | 1 | 0 | 0 | 0 |
| 1 | 0 | 1 | 0 | 1 | 0 | 1 | 1 | 0 | 0 |
| 1 | 0 | 1 | 1 | 1 | 1 | 0 | 0 | 1 | 0 |
| 1 | 1 | 0 | 0 | 1 | 0 | 0 | 1 | 0 | 0 |
| 1 | 1 | 0 | 1 | 1 | 0 | 1 | 0 | 0 | 0 |
| 1 | 1 | 1 | 0 | 1 | 0 | 1 | 1 | 0 | 0 |
| 1 | 1 | 1 | 1 | 1 | 1 | 0 | 0 | 1 | 1 |

It can be seen that the output AE is always equal to 1. Hence, the counter 61 is always enabled so that count A is incremented at each clock beat. This is necessary since count A represents the least significant bits of the count sequence.

When count A overflows, AC is true and it can be seen from Table I that this causes the value of D to reverse i.e. each location with AC=1 has D equal to the complement of D'. Similarly, if both AC and D' are true, then the value of C is reversed. The effect of this is to cause the two bits C,D to step through the count sequence 00,01,10,11; i.e. the bits C,D provide a two-bit count driven by the carry-out of count A.

When AC, C' and D' are all true, the output signal BE is produced, and this causes count B to be incremented. Also, the signal X is produced, which causes the signals C',D' to be selected from the preset inputs, rather than from C and D; this causes the count C,D to be re-initialised at the specified preset value.

When AC,BC,C' and D' are all true, the output signal F is produced, indicating the end of the sequence.

Referring again to FIG. 6, this also shows the way in which the address bits A0–A8 for the buffer 20 are derived from the output of the sequence generator. Address bits A0–A4 are obtained from the counter 62. Address bits A5,A6 and A7,A8 are selected by switches 65,66, both of which are controlled by the signal SEL. When SEL=1, the switches are set in the position shown, so that A5 and A6 are supplied by C and D, and A7,A8 are supplied by the two least significant bits of counter 61. When SEL=0, the switches 65,66 are set into the opposite position, so that A5,A6 now come from counter 61 and A7,A8 are supplied by C and D. The three most significant bits of counter 61 provide the bits W0,W1,W2 and S0,S1,S2.

It will be appreciated that many other modifications to the system described above may be made without departing from the scope of the invention. For example, the buffers 20,21 may be organized at 16×4 arrays of bit positions instead of as 8×8 arrays. This would allow higher rates of data transfer into (or out of) the buffers than in the opposite direction.

I claim:
1. A data reorganization apparatus comprising:
 (a) a buffer store having a width equal to p×q bit positions, these positions being logically arranged in rows and columns with p bits per row and q bits per column, the buffer store comprising a plurality of random-access memory (RAM) components each having a plurality of addressable locations and each location containing a plurality of bits which can be assessed in parallel, wherein the number of RAM components times the number of bits each RAM location equals p×q, each of said RAM components being connected to said input means and to said output means,
 (b) multiplexing means for receiving a succession of input data words each of n×p bits and converting these into succession of p-bit groups at n times the clock rate of the input words,
 (c) input means, connected to the multiplexing means to receive each of the p-bit groups and connected to each row of bit positions in the buffer store, for writing each p-bit group into a selected row of bit positions in the buffer store,
 (d) output means, connected to each column of bit positions in the buffer store, for reading a succession of q-bit groups from selected columns of bit positions in the buffer store, and
 (e) demultiplexing means, connected to the output means, for receiving the q-bit groups read from the buffer store and assembling these q-bit groups into m×q-bit words at one mth the clock rate of the q-bit groups, where p, q, n, and m are all integers greater than one.

2. Apparatus according to claim 1 including addressing means connected to all the RAM components in the buffer in parallel for selecting a corresponding location in each RAM component.

3. Apparatus according to claim 2 wherein the addressing means comprises means for generating a read address and a write address and switching means for selectively applying either the write address or the read address to the RAM components in the buffer.

4. Apparatus according to claim 3 wherein said multiplexing means is connected to the addressing means to receive a predetermined portion of said write address as a control signal.

5. Apparatus according to claim 3 wherein said demultiplexing means is connected to the addressing means to receive a predetermined portion of said read address as a control signal.

6. Apparatus according to claim 3 wherein the means for generating the write address comprises a first counter, predetermined bits of which provide said write address, and further bits of which provide a control signal connected to said input means for selecting the row of bit positions into which the p-bit group is to be written.

7. Apparatus according to claim 6 wherein means for generating the read address comprises a counter, predetermined bits of which provide said read address, and further bits of which provide a control signal connected to said output means for selecting the column of bit positions from which the q-bit group is to be read.

8. A data reorganization apparatus comprising:
 (a) a buffer store having a plurality of bit positions logically arranged in rows and columns,
 (b) multiplexing means for receiving a succession of input data words, dividing each word into a plurality of groups of bits, and outputting these groups at a clock rate equal to multiple of the rate at which the input words are received,
 (c) input means, connected to the multiplexing means to receive each of said groups of bits, and connected to each row of bit positions in the buffer store, for writing each said group into a selected row of bit positions in the buffer store, (d) output means, connected to each column of bit positions in the buffer store, for reading a succession of groups of bits from selected columns of bit positions in the buffer store, and (e) demultiplexing means, connected to the output means, for receiving the groups read from the buffer store, assembling these groups into words and outputting these words at a clock rate equal to a fraction of the rate at which the groups are read out of the buffer store, said buffer store comprising a plurality of random-access memory (RAM) components each having a plurality of addressable locations, each of said RAM components being connected to said input means and to said output means.

9. A data reorganization apparatus comprising:
(a) first and second buffer stores each having a plurality of bit positions logically arranged in rows and columns,
(b) selection means connected to the buffer stores for selecting one of the buffer stores for writing and the other for reading,
(c) multiplexing means for receiving a succession of input data words, dividing each word into a plurality of groups of bits and outputting these groups at a clock rate equal to a multiple of the rate at which the input words are received,
(d) input means, connected to the multiplexing means to receive each of said groups of bits, and connected to each row of bit positions in the buffer store, for writing each said group into a selected row of bit positions in the buffer store selected for writing;
(e) output means, connected to each column of bit positions in the buffer store, for reading a succession of groups of bits from selected columns of bit positions in the buffer store selected for reading, and
(f) demultiplexing means, connected to the output means, for receiving the groups read from the buffer store, assembling these groups into words and outputting these words at a clock rate equal to a fraction of the rate at which the groups are read out of the buffer store, each buffer store comprising a plurality of random-access memory (RAM) components each having a plurality of addressable locations, each of said RAM components being connected to said input means and to said output means.

10. Apparatus according to claim 9 including addressing means for generating a write address and for generating a read address, and switching means connected to the addressing means for applying the write address in parallel to all the RAM components of the buffer store selected for writing and applying the read address in parallel to all the RAM components of the buffer store selected for reading.

11. Apparatus according to claim 9 including means connected to the selection means for reversing the roles of the buffer stores so that the buffer store currently selected for reading is now selected for writing vice versa, upon detecting that a predetermined number of groups has been written into the buffer store currently selected for writing and a predetermined number of groups has been read from the other store.

12. Data reorganization apparatus according to claim 8 in combination with:
(a) processing means for processing image data to produce a succession of image data words which are connected to said multiplexing means to supply said input data words, and
(b) display means connected to said demultiplexing means, for receiving and displaying said words output by the demultiplexing means.

* * * * *